(12) United States Patent
Harutyunyan et al.

(10) Patent No.: US 10,384,943 B2
(45) Date of Patent: *Aug. 20, 2019

(54) SYNTHESIS OF SMALL AND NARROW DIAMETER DISTRIBUTED CARBON SINGLE WALLED NANOTUBES

(71) Applicants: HONDA MOTOR CO., LTD., Tokyo (JP); THE OHIO STATE UNIVERSITY RESEARCH FOUNDATION, Columbus, OH (US)

(72) Inventors: Avetik Harutyunyan, Columbus, OH (US); Elena Pigos, Columbus, OH (US); Toshio Tokune, Dublin, OH (US)

(73) Assignees: HONDA MOTOR CO., LTD., Tokyo (JP); THE OHIO STATE UNIVERSITY RESEARCH FOUNDATION, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/666,249

(22) Filed: Aug. 1, 2017

(65) Prior Publication Data

US 2018/0029888 A1    Feb. 1, 2018

Related U.S. Application Data

(63) Continuation of application No. 11/222,892, filed on Sep. 8, 2005, now abandoned.

(60) Provisional application No. 60/609,145, filed on Sep. 9, 2004.

(51) Int. Cl.

| D01F 9/12 | (2006.01) |
|---|---|
| C01B 32/162 | (2017.01) |
| B82Y 30/00 | (2011.01) |
| B82Y 40/00 | (2011.01) |
| D01F 9/127 | (2006.01) |

(52) U.S. Cl.
CPC ............ *C01B 32/162* (2017.08); *B82Y 30/00* (2013.01); *B82Y 40/00* (2013.01); *D01F 9/127* (2013.01); *D01F 9/1272* (2013.01); *C01B 2202/02* (2013.01); *C01B 2202/36* (2013.01)

(58) Field of Classification Search
CPC .................................................. C01B 32/162
See application file for complete search history.

(56) References Cited

U.S. PATENT DOCUMENTS

| 5,424,054 A | 6/1995 | Bethune et al. |
|---|---|---|
| 5,707,916 A | 1/1998 | Snyder et al. |
| 6,401,526 B1 | 6/2002 | Dai et al. |
| 6,413,487 B1 | 7/2002 | Resasco et al. |
| 6,730,284 B2 | 5/2004 | Harutyuyan |
| 6,764,874 B1 | 7/2004 | Zhang et al. |
| 6,974,492 B2 | 12/2005 | Harutyunyan |
| 7,871,591 B2 | 1/2011 | Harutyunyan et al. |
| 8,163,263 B2 | 4/2012 | Harutyunyan et al. |
| 2002/0172767 A1 | 11/2002 | Grigorian et al. |
| 2002/0178846 A1 | 12/2002 | Dai et al. |
| 2003/0149163 A1 | 8/2003 | Sun et al. |
| 2003/0185741 A1 | 10/2003 | Matyjaszewski et al. |
| 2003/0207326 A1 | 11/2003 | Su et al. |
| 2004/0005269 A1 | 1/2004 | Huang et al. |
| 2004/0009208 A1 | 1/2004 | Edson et al. |
| 2004/0040834 A1 | 3/2004 | Smalley et al. |
| 2004/0099092 A1 | 5/2004 | Harutyuyan et al. |
| 2004/0101467 A1 | 5/2004 | Harutyunyan et al. |
| 2004/0131532 A1 | 7/2004 | Resasco et al. |
| 2005/0074392 A1 | 4/2005 | Yang et al. |
| 2005/0123467 A1 | 6/2005 | Harutyunyan |
| 2005/0238810 A1 | 10/2005 | Scaringe et al. |
| 2006/0025515 A1 | 2/2006 | Scaringe et al. |
| 2006/0240974 A1 | 10/2006 | Hongo |
| 2007/0041886 A1 | 2/2007 | Ishida et al. |

FOREIGN PATENT DOCUMENTS

| EP | 1 692 077 B1 | 8/2015 |
|---|---|---|
| JP | 2002-255519 A | 9/2002 |
| JP | 2003-054922 A | 2/2003 |
| JP | 2003-524516 A | 8/2003 |
| JP | 2003-524770 A | 8/2003 |
| JP | 2004-026532 A | 1/2004 |
| JP | 2004-067413 A | 3/2004 |
| JP | 2004/048019 A1 | 6/2004 |
| JP | 2004/048262 A1 | 6/2004 |
| JP | 2005-350750 A | 12/2005 |
| JP | 2006-505483 A | 2/2006 |
| JP | 4177533 B2 | 11/2008 |
| JP | 4306990 B2 | 8/2009 |
| JP | 5065898 B2 | 11/2012 |
| WO | WO 2000/058003 A1 | 10/2000 |
| WO | WO 2000/073205 A1 | 12/2000 |

(Continued)

OTHER PUBLICATIONS

Extended European Search Report of related European Application No. 17175733.9 dated Sep. 22, 2017.

Ago, Hiroki et al., "Gas-Phase Synthesis of Single-Wall Carbon Nanotubes from Colloidal Solution of Metal Nanoparticles", Journal of Physical Chemistry, vol. 105, No. 43., pp. 10453-10456, Nov. 1, 2001.

Alvarez et. al., "Synergism of Co and Mo in the Catalytic Production of Single-walled Carbon Nanotubes by Decomposition of CO," Carbon, vol. 39, pp. 547-558, 2001.

(Continued)

*Primary Examiner* — Stuart L Hendrickson
(74) *Attorney, Agent, or Firm* — Arent Fox LLP (57) ABSTRACT

Method and processes for synthesizing single-wall carbon nanotubes is provided. A carbon precursor gas is contacted with metal catalysts deposited on a support material. The metal catalysts are preferably nanoparticles having diameters less than about 50 nm. The reaction temperature is selected such that it is near the eutectic point of the mixture of metal catalyst particles and carbon.

22 Claims, 5 Drawing Sheets

(56) References Cited

FOREIGN PATENT DOCUMENTS

| WO | WO 02/081371 A | 10/2002 |
|----|----------------|---------|
| WO | WO 03/057955 A | 7/2003 |
| WO | WO 03/068676 A1 | 8/2003 |
| WO | WO 06/091277 A | 8/2006 |

OTHER PUBLICATIONS

Baughman, R., et. al. "Carbon Nanotubes—the Route Toward Applications," Science, vol. 297, No. 5582, pp. 787-792, Aug. 2, 2007.

Bethune, D.S. et al., "Cobalt-Catalysed Growth of Carbon Nanotubes with Single-Atomic-Layer Walls", Nature, vol. 363, pp. 605-607, Jun. 17, 1993.

Cassell, Alan M. et al., "Large Scale CVD Synthesis of Single-Walled Carbon Nanotubes", Journal of Physical Chemistry, vol. 103, pp. 6484-6492, 1999.

Cheng, H.M. et al., "Large-Scale and Low-Cost Synthesis of Single-Walled Carbon Nanotubes by the Catalytic Pyrolysis of Hydrocarbons", Applied Physics Letters, vol. 72, No. 25 pp. 3282-3284.

Ci, Lijie et al., "Preparation of Carbon Nanofibers by the Floating Catalyst. Method" Carbon, vol. 38. pp. 1933-1937,2000.

Dai, H. et al., "Single-Wall Nanotubes Produced by Metal-Catalyzed Disproportionation of Carbon Monoxide", Chemical Physics Letters, vol. 260, pp. 471-475, 1996.

Ding, F., et. al., "Molecular Dynamics Study of the Catalyst Particle Size Dependence on Carbon Nanotube Growth," Journal of Chemical Physics, vol. 121, No. 6, pp. 2775-2779, Aug. 8, 2004.

European Patent Office Communication in related European Patent Application No. 05 858 518.3, dated Sep. 27, 2012.

European Search Report, in EP Patent Application No. 05858518.3 dated Jul. 8, 2009.

Hafner et al., "Catalytic Growth of Single Wall Carbon Nanotubes from Metal Particles", Chemical Physics Letters, pp. 195, vol. 296, 1998.

Harutyunyan, A. et al., "CVD Synthesis of Single Wall Carbon Nanotubes Under 'Soft' Conditions," NanoLetters, vol. 2, No. 5., pp. 525-530.

Harutyunyan, A., et. al., "Liquid as a required catalyst phase for carbon single-walled nanotube growth," Applied Physics Letters, vol. 87, pp. 051919-1-051919-3, 2005.

Harutyunyan, U.S. Appl. No. 10/727,707, filed Dec. 3, 2003.

Hill, R., et. al., "Physical Metallurgy Principles," PWS-Kent Publishing Company, Boston, Massachutes, U.S., 3rd edition, 1992.

Homma, et. al., "Role of Transition Metal Catalyst in Single-Walled Carbob Nanotube Growth in Chemical Vapor Deposition," Journal of Physical Chemistry B., vol. 107, pp. 12161-12164, 2003.

Homma, Y. et. al. "Effect of Catalysts on Carbon Nanotube Growth on Silicon Substrates in Chemical Vapor Deposition," vol. 25, No. 6, pp. 339-344, Jun. 2004.

Iijima, Sumio et al., "Single-Shell Carbon Nanotubes of 1-Nm Diameter", Nature, vol. 363, pp. 603-605, Jun. 17, 1993.

Ivanov, V. et al. "The Study of Carbon Nanotubles Produced by Catalytic Method", Elsevier Science B.V., Chemical Physics Letters, vol. 223, pp. 329-335, Jun. 24, 1994.

Japanese Office Action in related Japanese Patent Application No. 2007-532376 dated Jul. 12, 2011.

Japense Office Action in related Japenese Patent Application No. 2007-532376, dated Jan. 10, 2012.

Journet, C. et al., "Large-Scale Production of Single-Walled Carbon Nanotubes by the Electric-Arc Technique", Nature, vol. 388, pp. 756-758, Aug. 21, 1997.

Kanzow, H., et. al., "Formation mechanism of single-wall carbon nanotubes on liquid-metal particles," Physical Review B, vol. 60, No. 15, pp. 11 180-11 186, Oct. 15, 1999.

Li, W.Z. et al.,"Large-Scale Synthesis of Aligned Carbon Nanotubes",Science, vol. 274, pp. 1701-1703,Dec. 6, 1996.

Li, Y., et. al., Growth of Single-Walled Carbon Nanotubes from Discrete Catalytic Nanoparticles of Particles of Various Sizes, Journal of Physical Chemistry, vol. 105, No. 46, pp. 11424-11431, Oct. 31, 2001.

Nikolaev, Pavel et al., "Gas-Phase Catalytic Grown of Single-Walled Carbon Nanotubes From Carbon Monoxide", Elsevier Science B.V., Chemical Physical Letters, vol. 313, pp. 91-97, 1999.

PCT International Search Report and Written Opinion in PCt/US05/32082 dated Mar. 29, 2007.

PCT International Search Report and Written Opinion in related PCT Application No. PCT/US2007/02513, eight pages, dated Feb. 22, 2008.

PCT International Search Report and Written Opinion, in related PCT Application No. PCT/US2006/00929, six pages, dated Sep. 12, 2007.

Saito, Y. et al., "Extrusion of Single-Wall Carbon Nanotubes via Formation of Small Particles Condensed Near an Arc Evaporation Source." Chemical Physics Letters, vol. 236, pp. 419-426, Apr. 21, 1995.

Su, Ming et al., "A Scalable CVD Method for the Synthesis of Single-Walled Carbon Nanotubes with High Catalyst Productivity", Elsevier Science B.V., Chemical Physics Letters, vol. 322, pp. 321-326, May 26, 2000.

Thess, Andreas et al., "Crystalline Ropes of Metallic Carbon Nanotubes", Science, vol. 273, pp. 483-487, Jul. 26, 1996.

Zhu, W.H. et al., "Direct Synthesis of Long Single-Walled Carbon Nanotube Strands", Science, vol. 296, pp. 884-886, May 3, 2002.

Fig. 3C

SYNTHESIS OF SMALL AND NARROW DIAMETER DISTRIBUTED CARBON SINGLE WALLED NANOTUBES

CROSS-REFERENCE TO RELATED APPLICATIONS

This application is a continuation of U.S. patent application Ser. No. 11/222,892, filed on Sep. 8, 2005, which claims priority from U.S. Provisional Patent Application No. 60/609,145, filed on Sep. 9, 2004, the disclosure of which is herein incorporated by reference in its entirety.

FIELD OF INVENTION

The present invention relates to methods for the preparation (synthesis) of carbon single-walled nanotubes using chemical vapor deposition method.

BACKGROUND

Carbon nanotubes are hexagonal networks of carbon atoms forming seamless tubes with each end capped with half of a fullerene molecule. They were first reported in 1991 by Sumio Iijima who produced multi-layer concentric tubes or multi-walled carbon nanotubes by evaporating carbon in an arc discharge. They reported carbon nanotubes having up to seven walls. In 1993, Iijima's group and an IBM team headed by Donald Bethune independently discovered that a single-wall nanotube could be made by vaporizing carbon together with a transition metal such as iron or cobalt in an arc generator (see Iijima et al. Nature 363:603 (1993); Bethune et al., Nature 363: 605 (1993) and U.S. Pat. No. 5,424,054). The original syntheses produced low yields of non-uniform nanotubes mixed with large amounts of soot and metal particles.

Presently, there are three main approaches for the synthesis of single- and multi-walled carbon nanotubes. These include the electric arc discharge of graphite rod (Journet et al. Nature 388: 756 (1997)), the laser ablation of carbon (Thess et al. Science 273: 483 (1996)), and the chemical vapor deposition of hydrocarbons (Ivanov et al. Chem. Phys. Lett 223: 329 (1994); Li et al. Science 274: 1701 (1996)). Multi-walled carbon nanotubes can be produced on a commercial scale by catalytic hydrocarbon cracking while single-walled carbon nanotubes are still produced on a gram scale.

Generally, single-walled carbon nanotubes are preferred over multi-walled carbon nanotubes because they have unique mechanical and electronic properties. Defects are less likely to occur in single-walled carbon nanotubes because multi-walled carbon nanotubes can survive occasional defects by forming bridges between unsaturated carbon valances, while single-walled carbon nanotubes have no neighboring walls to compensate for defects. Defect-free single-walled nanotubes are expected to have remarkable mechanical, electronic and magnetic properties that could be tunable by varying the diameter, number of concentric shells, and chirality of the tube.

Single-walled carbon nanotubes have been produced by simultaneously evaporating carbon and a small percentage of Group VIII transition metal from the anode of the arc discharge apparatus (Saito et al. Chem. Phys. Lett. 236: 419 (1995)). Further, the use of mixtures of transition metals has been shown to increase the yield of single-walled carbon nanotubes in the arc discharge apparatus. However, the yield of nanotubes is still low, the nanotubes can exhibit significant variations in structure and size (properties) between individual tubes in the mixture, and the nanotubes can be difficult to separate from the other reaction products. In a typical arc discharge process, a carbon anode loaded with catalyst material (typically a combination of metals such as nickel/cobalt, nickel/cobalt/iron, or nickel and transition element such as yttrium) is consumed in arc plasma. The catalyst and the carbon are vaporized and the single-walled carbon nanotubes are grown by the condensation of carbon onto the condensed liquid catalyst. Sulfur compounds such as iron sulfide, sulfur or hydrogen sulfides are typically used as catalyst promoter to maximize the yield of the product.

A typical laser ablation process for producing single-walled carbon nanotubes is disclosed by Andreas Thess et al. (1996). Metal catalyst particle such as nickel-cobalt alloy is mixed with graphite powder at a predetermined percentage, and the mixture is pressed to obtain a pellet. A laser beam is radiated to the pellet. The laser beam evaporates the carbon and the nickel-cobalt alloy, and the carbon vapor is condensed in the presence of the metal catalyst. Single-wall carbon nanotubes with different diameters are found in the condensation. However, the addition of a second laser to their process which give a pulse 50 nanoseconds after the pulse of the first laser favored the (10,10) chirality (a chain of 10 hexagons around the circumference of the nanotube). The product consisted of fibers approximately 10 to 20 nm in diameter and many micrometers long comprising randomly oriented single-wall nanotubes, each nanotube having a diameter of about 1.38 nm.

Many researchers consider chemical vapor deposition as the only viable approach to large scale production and for controllable synthesis of carbon single walled nanotubes (Dai et al. (Chem. Phys. Lett 260: 471 (1996), Hafner et al., Chem. Phys. Lett. 296: 195 (1998), Su. M., et al. Chem Phys. Lett., 322: 321 (2000)). Typically, the growth of carbon SWNTs by CVD method is conducting at the temperatures 550-1200° C. by decomposition of hydrocarbon gases (methane, ethylene, alcohol, . . . ) on metal nanoparticles (Fe, Ni, Co, . . . ) supported by oxide powders. The diameters of the single-walled carbon nanotubes vary from 0.7 nm to 3 nm. The synthesized single-walled carbon nanotubes are roughly aligned in bundles and woven together similarly to those obtained from laser vaporization or electric arc method. The use of metal catalysts comprising iron and at least one element chosen from Group V (V, Nb and Ta), VI (Cr, Mo and W), VII (Mn, Tc and Re) or the lanthanides has also been proposed (U.S. Pat. No. 5,707,916).

Presently, there are two types of chemical vapor deposition for the syntheses of single-walled carbon nanotubes that are distinguishable depending on the form of supplied catalyst. In one, the catalyst is embedded in porous material or supported on a substrate, placed at a fixed position of a furnace, and heated in a flow of hydrocarbon precursor gas. Cassell et al. (1999) J. Phys. Chem. B 103: 6484-6492 studied the effect of different catalysts and supports on the synthesis of bulk quantities of single-walled carbon nanotubes using methane as the carbon source in chemical vapor deposition. They systematically studied $Fe(NO_3)_3$ supported on $Al_2O_3$, $Fe(SO_4)_3$ supported on $Al_2O_3$, Fe/Ru supported on $Al_2O_3$, Fe/Mo supported on $Al_2O_3$, and Fe/Mo supported on $Al_2O_3$—$SiO_2$ hybrid support. The bimetallic catalyst supported on the hybrid support material provided the highest yield of the nanotubes. Su et al. (2000) Chem. Phys. Lett. 322: 321-326 reported the use of a bimetal catalyst supported on an aluminum oxide aerogel to produce single-walled carbon nanotubes. They reported preparation of the nanotubes is greater than 200% the weight of the catalyst used. In comparison, similar catalyst supported on $Al_2O_3$ powder yields approximately 40% the weight of the starting catalyst. Thus, the use of the aerogel support improved the amount of nanotubes produced per unit weight of the catalyst by a factor of 5.

In the second type of carbon vapor deposition, the catalyst and the hydrocarbon precursor gas are fed into a furnace using the gas phase, followed by the catalytic reaction in a gas phase. The catalyst is usually in the form of a metalorganic. Nikolaev et al. (1999) Chem. Phys. Lett. 313: 91 disclose a high-pressure CO reaction (HiPCO) method in which carbon monoxide (CO) gas reacts with the metalorganic iron pentacarbonyl ($Fe(CO)_5$) to form single-walled carbon nanotubes. It is claimed that 400 g of nanotubes can be synthesized per day. Chen et al. (1998) Appl. Phys. Lett. 72: 3282 employ benzene and the metalorganic ferrocene ($Fe(C_5H_5)_2$) delivered using a hydrogen gas to synthesize single-walled carbon nanotubes. The disadvantage of this approach is that it is difficult to control particles sizes of the metal catalyst. The decomposition of the organometallic provides disordered carbon (not desired) the metal catalyst having variable particle size that results in nanotubes having a wide distribution of diameters and low yields.

In another method, the catalyst is introduced as a liquid pulse into the reactor. Ci et al. (2000) Carbon 38: 1933-1937 dissolve ferrocene in 100 mL of benzene along with a small amount of thiophene. The solution is injected into a vertical reactor in a hydrogen atmosphere. The technique requires that the temperature of bottom wall of the reactor had to be kept at between 205-230° C. to obtain straight carbon nanotubes. In the method of Ago et al. (2001) J. Phys. Chem. 105: 10453-10456, colloidal solution of cobalt:molybdenum (1:1) nanoparticles is prepared and injected into a vertically arranged furnace, along with 1% thiophene and toluene as the carbon source. Bundles of single-walled carbon nanotubes are synthesized. One of the disadvantages of this approach is the very low yield of the nanotubes produced.

It is generally recognized that smaller catalyst particles of less than 3 nm are preferred for the growth of smaller diameter carbon nanotubes. However, the smaller catalyst particles easily aggregate at the higher temperatures required for the synthesis of carbon nanotubes. U.S. Patent Application No. 2004/0005269 to Huang et al. discloses a mixture of catalysts containing at least one element from Fe, Co, and Ni, and at least one supporting element from the lanthanides. The lanthanides are said to decrease the melting point of the catalyst by forming alloys so that the carbon nanostructures can be grown at lower temperatures.

Aside from the size of the catalyst, the temperature of the reaction chamber can also be important for the growth of carbon nanotubes. U.S. Pat. No. 6,764,874 to Zhang et al. discloses a method of preparing nanotubes by melting aluminum to form an alumina support and melting a thin nickel film to form nickel nanoparticles on the alumina support. The catalyst is then used in a reaction chamber at less than 850° C. U.S. Pat. No. 6,401,526, and U.S. Patent Application Publication No. 2002/00178846, both to Dai et al., disclose a method of forming nanotubes for atomic force microscopy. A portion of the support structure is coated with a liquid phase precursor material that contains a metal-containing salt and a long-chain molecular compound dissolved in a solvent. The carbon nanotubes are made at a temperature of 850° C.

Thus, it is well known that the diameter of the SWNTs produced is proportional to the size of the catalyst particle. In order to synthesize nanotubes of small diameter, it s necessary to have catalyst particles of very small particle size (less than about 1 rim). Catalysts of small particle size are difficult to synthesize, and even with small catalyst particle sizes, a distribution of catalyst sizes is obtained which results in the formation of nanotubes with a range of diameters.

One solution to the synthesis of uniform diameter nanotubes is to use a template, such as molecular sieves, that have a pore structure which is used to control the distribution of catalyst size and thereby the size of the SWNTs formed. Thus, the diameter of SWNT can be changed by changing the pore size of the template. These methods are not versatile. Thus, there is a need for methods and processes for controllable synthesis of carbon single walled nanotubes with small and narrow distributed diameters. Accordingly, the present invention provides novel methods and processes for the synthesis of SWNTs with small and narrow distributed diameters.

SUMMARY

The present invention provides methods and processes for growing single-wall carbon nanotubes. In one aspect, a carbon precursor gas and metal catalysts on supports are heated to a reaction temperature near the eutectic point (liquid phase) of the metal-carbon phase. Further, the reaction temperature is below the melting point of the metal catalysts.

In one aspect, the methods involve contacting a carbon precursor gas with a catalyst on a support at a temperature near the eutectic point of the catalyst-carbon phase wherein SWNT are formed. The carbon precursor gas can be methane that can additionally contain other gases such as argon and hydrogen. The catalyst can be a V metal, a Group VI metal, a Group VII metal, a Group VIII metal, a lanthanide, or a transition metal or combinations thereof. The catalyst preferably has a particle size between about 1 nm to about 50 nm. The catalyst can be supported on a powdered oxide, such as $Al_2O_3$, $SiO_2$, MgO and the like, herein the catalyst and the support are in a ratio of about 1:1 to about 1:50. The SWNTs are produced by employing a reaction temperature that is about 5° C. to about 150° C. above the eutectic point.

In another aspect, the invention provides a carbon nanotube structure produced by the process of contacting a carbon precursor gas with a catalyst on a support at a temperature between the melting point of the catalyst and the eutectic point of the catalyst and carbon. The carbon precursor gas can be methane that can additionally contain other gases such as argon and hydrogen. The catalyst can be a V metal, a Group VI metal, a Group VII metal, a Group VIII metal, a lanthanide, or a transition metal or combinations thereof. The catalyst preferably has a particle size between about 1 nm to about 15 nm. The catalyst can be supported on a powdered oxide, such as $Al_2O_3$, $SiO_2$, MgO and the like, wherein the catalyst and the support are in a ratio of about 1:1 to about 1:50.

DETAILED DESCRIPTION

I. Definitions

Unless otherwise stated, the following terms used in this application, including the specification and claims, have the definitions given below. It must be noted that, as used in the specification and the appended claims, the singular forms "a," "an" and "the" include plural referents unless the context clearly dictates otherwise. Definition of standard chemistry terms may be found in reference works, including Carey and Sundberg (1992) "Advanced Organic Chemistry 3rd Ed." Vols. A and B, Plenum Press, New York, and Cotton et al. (1999) "Advanced Inorganic Chemistry 6th Ed." Wiley, New York.

The terms "single-walled carbon nanotube" or "one-dimensional carbon nanotube" are used interchangeable and refer to cylindrically shaped thin sheet of carbon atoms having a wall consisting essentially of a single layer of carbon atoms, and arranged in a hexagonal crystalline structure with a graphitic type of bonding.

The term "multi-walled carbon nanotube" as used herein refers to a nanotube composed of more than one concentric tubes.

The terms "metalorganic" or "organometallic" are used interchangeably and refer to co-ordination compounds of organic compounds and a metal, a transition metal or metal halide.

The term "eutectic point" refers to the lowest possible temperature of solidification for an alloy, and can be lower than that of any other alloy composed of the same constituents in different proportions.

II. Overview

The present invention discloses methods, apparatus, and processes for the manufacture of carbon nanotubes and structures composed of single-wall nanotubes of preselected diameter and preselected range of diameters wherein the diameter of the SWNTs is substantially uniform.

The invention relates to chemical vapor deposition processes for the production of single-walled carbon nanotubes (SWNT) having substantially uniform diameter. According to the invention, SWNT of preselected diameter distribution can be produced by contacting a carbon-containing gas with a catalyst supported on a support. The catalyst particles are selected to have a defined range of diameter, wherein the range is narrow. The carbon-containing gas contacts the catalyst at a temperature sufficient to decompose the carbon-containing gas and causing the growth of SWNT. The reaction temperature is preferably close to the eutectic point of the catalyst-carbon phase wherein the catalyst particles with smallest diameters are activated (liquefaction) for growing single-walled nanotubes, while larger diameter catalyst, having higher eutectic temperatures, are inactive. Thus, the diameter distribution of the SWNTs can be controlled by using growth temperature close to the eutectic point of the small catalyst particles.

III. The Reaction Vessel

In one aspect of the invention, a system for producing carbon nanotubes is provided. The system comprises a reactor capable of supporting at least one temperature zone, preferably a plurality of temperature zones and having an air-tight reaction chamber where a source of carbon precursor gas and a source of inert gases is provided, optionally a sample holder can be placed within the air-tight reaction chamber, and an evacuating system connected to the reactor for evacuating gases from the chamber.

Typically, a commercially available "horizontal" reaction furnace can be used to perform various embodiments of the present invention. Reaction furnace can be any conventional furnace configured to allow for control over gas flows within a heated reaction chamber. For example, the Carbolite model TZF 12/65/550 is a suitable horizontal 3-zone furnace for carrying out the various aspects of the present invention.

Optionally, a quartz tube can be placed inside of reaction furnace to serve as a reaction chamber. The quartz tube can serve as the reaction chamber for reaction furnace, while the reaction furnace provides any required heat for a process. Reaction chamber has one or more gas inlet ports and gas outlet port to allow for control over the composition of the atmosphere within the quartz tube. Depending on the requirements for a given process, additional gas inlet ports can be added or unnecessary ones can be sealed off. Alternatively, the reaction chamber can be configured to allow for low pressure operation by attaching a vacuum pump to gas outlet port. Other types of reaction chambers suitable for use with the present invention will be apparent to those of skill in the art. During operation of reaction furnace, a sample holder can be placed within quartz tube, such as a quartz boat, a quartz substrate, or another type of reaction vessel or substrate. Typically a sample holder is used to facilitate introduction or removal of materials into the quartz tube or other reaction chamber. The material to be processed is placed on or in sample holder during the gas flow and heating steps of a desired process.

In a typical operation, a sample holder containing a catalyst can be placed inside reaction chamber. Then, the pressure in reaction chamber can be reduced by vacuum pump which can be any conventional vacuum pump. When the interior pressure of reaction chamber reaches the desired pressure, the physical vapor deposition process is initiated by modulating the temperature in temperature zones.

IV. The Catalyst

The catalyst composition may be any catalyst composition known to those of skill in the art that is routinely used in chemical vapor deposition processes. The function of the catalyst in the carbon nanotube growth process is to decompose the carbon precursors and aid the deposition of ordered carbon. The method, processes, and apparatuses of the present invention preferably use metal nanoparticles as the metallic catalyst. The metal or combination of metals selected as the catalyst can be processed to obtain the desired particle size and diameter distribution. The metal nanoparticles can then be separated by being supported on a material suitable for use as a support during synthesis of carbon nanotubes using the metal growth catalysts described below. As known in the art, the support can be used to separate the catalyst particles from each other thereby providing the catalyst materials with greater surface area in the catalyst composition. Such support materials include powders of crystalline silicon, polysilicon, silicon nitride, tungsten, magnesium, aluminum and their oxides, preferably aluminum oxide, silicon oxide, magnesium oxide, or titanium dioxide, or combination thereof, optionally modified by addition elements, are used as support powders. Silica, alumina and other materials known in the art may be used as the support, preferably alumina is used as the support.

The metal catalyst can be selected from a Group V metal, such as V or Nb, and mixtures thereof, a Group VI metal including Cr, W, or Mo, and mixtures thereof, VII metal, such as, Mn, or Re, Group VIII metal including Co, Ni, Ru, Rh, Pd, Os, Ir, Pt, and mixtures thereof, or the lanthanides, such as Ce, Eu, Er, or Yb and mixtures thereof, or transition metals such as Cu, Ag, Au, Zn, Cd, Sc, Y, or La and mixtures thereof. Specific examples of mixture of catalysts, such as bimetallic catalysts, which may be employed by the present invention include Co—Cr, Co—W, Co—Mo, Ni—Cr, Ni—W, Ni—Mo, Ru—Cr, Ru—W, Ru—Mo, Rh—Cr, Rh—W, Rh—Mo, Pd—Cr, Pd—W, Pd—Mo, Ir—Cr, Pt—Cr, Pt—W, and Pt—Mo. Preferably, the metal catalyst is iron, cobalt, nickel, molybdenum, or a mixture thereof, such as Fe—Mo, Co—Mo and Ni—Fe—Mo.

The metal, bimetal, or combination of metals can be used to prepare metal nanoparticles having defined particle size and diameter distribution. The metal nanoparticles can be prepared using the literature procedure described in described in Harutyunyan et al., NanoLetters 2, 525 (2002). Alternatively, the catalyst nanoparticles can be prepared by thermal decomposition of the corresponding metal salt added to a passivating salt, and the temperature of the solvent adjusted to provide the metal nanoparticles, as described in the co-pending and co-owned U.S. patent application Ser. No. 10/304,316, or by any other method known in the art. The particle size and diameter of the metal nanoparticles can be controlled by using the appropriate concentration of metal in the passivating solvent and by controlling the length of time the reaction is allowed to proceed at the thermal decomposition temperature. Metal nanoparticles having particle size of about 0.01 nm to about 20 nm, more preferably about 0.1 nm to about 3 nm and most preferably about 0.3 nm to 2 nm can be prepared. The metal nanoparticles can thus have a particle size of 0.1, 1, 2, 3, 4, 5, 6, 7, 8, 9, or 10 nm, and up to about 20 nm. In another aspect, the metal nanoparticles can have a range of particle sizes. For example, the metal nanoparticles can have particle sizes in the range of about 3 nm and about 7 nm in size, about 5 nm and about 10 nm in size, or about 8 nm and about 16 nm in size. The metal nanoparticles can optionally have a diameter distribution of about 0.5 nm to about 20 nm, preferably about 1 nm to about 15 nm, more preferably about 1 nm to about 5 nm. Thus, the metal nanoparticles can have a diameter distribution of about 1, 2, 3, 4, 5, 6, 7, 8, 9, 10, 11, 12, 13, 14, or 15 nm.

The metal salt can be any salt of the metal, and can be selected such that the melting point of the metal salt is lower than the boiling point of the passivating solvent. Thus, the metal salt contains the metal ion and a counter ion, where the counter ion can be nitrate, nitride, perchlorate, sulfate, sulfide, acetate, halide, oxide, such as methoxide or ethoxide, acetylacetonate, and the like. For example, the metal salt can be iron acetate ($FeAc_2$), nickel acetate ($NiAc_2$), palladium acetate ($PdAc_2$), molybdenum acetate ($MoAc_3$), and the like, and combinations thereof The melting point of the metal salt is preferably about 5° C. to 50° C. lower than the boiling point, more preferably about 5° C. to about 20° C. lower than the boiling point of the passivating solvent.

The metal salt can be dissolved in a passivating solvent to give a solution, a suspension, or a dispersion. The solvent is preferably an organic solvent, and can be one in which the chosen metal salt is relatively soluble and stable, and where the solvent has a high enough vapor pressure that it can be easily evaporated under experimental conditions. The solvent can be an ether, such as a glycol ether, 2-(2-butoxyethoxy)ethanol, $H(OCH_2CH_2)_2O(CH_2)_3CH_3$, which will be referred to below using the common name diethylene glycol mono-n-butyl ether, and the like.

The relative amounts of metal salt and passivating solvent are factors in controlling the size of nanoparticles produced. A wide range of molar ratios, here referring to total moles of metal salt per mole of passivating solvent, can be used for forming the metal nanoparticles. Typical molar ratios of metal salt to passivating solvent include ratios as low as about 0.0222 (1:45), or as high as about 2.0 (2:1), or any ratio in between. Thus, for example, about $5.75 \times 10^{-5}$ to about $1.73 \times 10^{-3}$ moles (10-300 mg) of $FeAc_2$ can be dissolved in about $3 \times 10^{-4}$ to about $3 \times 10^{-3}$ moles (50-500 ml) of diethylene glycol mono-n-butyl ether.

In another aspect, more than one metal salt can be added to the reaction vessel in order to form metal nanoparticles composed of two or more metals, where the counter ion can be the same or can be different. The relative amounts of each metal salt used can be a factor in controlling the composition of the resulting metal nanoparticles. For the bimetals, the molar ratio of the first metal salt to the second metal salt can be about 1:10 to about 10:1, preferably about 2:1 to about 1:2, more preferably about 1.5:1 to about 1:1.5, or any ratio in between. Thus, for example, the molar ratio of iron acetate to nickel acetate can be 1:2, 1:1.5, 1.5:1, or 1:1. Those skilled in the art will recognize that other combinations of metal salts and other molar ratios of a first metal salt relative to a second metal salt may be used in order to synthesize metal nanoparticles with various compositions.

The passivating solvent and the metal salt reaction solution can be mixed to give a homogeneous solution, suspension, or dispersion. The reaction solution can be mixed using standard laboratory stirrers, mixtures, sonicators, and the like, optionally with heating. The homogenous mixture thus obtained can be subjected to thermal decomposition in order to form the metal nanoparticles.

The thermal decomposition reaction is started by heating the contents of the reaction vessel to a temperature above the melting point of at least one metal salt in the reaction vessel. Any suitable heat source may be used including standard laboratory heaters, such as a heating mantle, a hot plate, or a Bunsen burner, and the heating can be under reflux. The length of the thermal decomposition can be selected such that the desired size of the metal nanoparticles can be obtained. Typical reaction times can be from about 10 minutes to about 120 minutes, or any integer in between. The thermal decomposition reaction is stopped at the desired time by reducing the temperature of the contents of the reaction vessel to a temperature below the melting point of the metal salt.

The size and distribution of metal nanoparticles produced can be verified by any suitable method. One method of verification is transmission electron microscopy (TEM). A suitable model is the Phillips CM300 FEG TEM that is commercially available from FEI Company of Hillsboro, Oreg. In order to take TEM micrographs of the metal nanoparticles, 1 or more drops of the metal nanoparticle/passivating solvent solution are placed on a carbon membrane grid or other grid suitable for obtaining TEM micrographs. The TEM apparatus is then used to obtain micrographs of the nanoparticles that can be used to determine the distribution of nanoparticle sizes created.

The metal nanoparticles, such as those formed by thermal decomposition described in detail above, can then be supported on solid supports. The solid support can be silica, alumina, MCM-41, MgO, $ZrO_2$, aluminum-stabilized magnesium oxide, zeolites, or other oxidic supports known in the art, and combinations thereof. For example, $Al_2O_3$—$SiO_2$ hybrid support could be used. Preferably, the support is aluminum oxide ($Al_2O_3$) or silica ($SiO_2$). The oxide used as solid support can be powdered thereby providing small particle sizes and large surface areas. The powdered oxide can preferably have a particle size between about 0.01 µm to about 100 more preferably about 0.1 µm to about 10 even more preferably about 0.5 µm to about 5 µm and most preferably about 1 µm to about 2 The powdered oxide can have a surface area of about 50 to about 1000 $m^2/g$, more preferably a surface area of about 200 to about 800 $m^2/g$. The powdered oxide can be freshly prepared or commercially available.

In one aspect, the metal nanoparticles are supported on solid supports via secondary dispersion and extraction. Secondary dispersion begins by introducing particles of a powdered oxide, such as aluminum oxide ($Al_2O_3$) or silica ($SiO_2$), into the reaction vessel after the thermal decomposition reaction. A suitable $Al_2O_3$ powder with 1-2 µm particle size and having a surface area of 300-500 m2/g is commercially available from Alfa Aesar of Ward Hill, Mass., or Degussa, N.J. Powdered oxide can be added to achieve a desired weight ratio between the powdered oxide and the initial amount of metal used to form the metal nanoparticles. Typically, the weight ratio can be between about 10:1 and about 15:1. For example, if 100 mg of iron acetate is used as the starting material, then about 320 to 480 mg of powdered oxide can be introduced into the solution.

The mixture of powdered oxide and the metal nanoparticle/passivating solvent mixture can be mixed to form a homogenous solution, suspension or dispersion. The homogenous solution, suspension or dispersion can be formed using sonicator, a standard laboratory stirrer, a mechanical mixer, or any other suitable method, optionally with heating. For example, the mixture of metal nanoparticles, powdered oxide, and passivating solvent can be first sonicated at roughly 80° C. for 2 hours, and then sonicated and mixed with a laboratory stirrer at 80° C. for 30 minutes to provide a homogenous solution.

After secondary dispersion, the dispersed metal nanoparticles and powdered oxide can be extracted from the passivating solvent. The extraction can be by filtration, centrifugation, removal of the solvents under reduced pressure, removal of the solvents under atmospheric pressure, and the like. For example, extraction includes heating the homogenized mixture to a temperature where the passivating solvent has a significant vapor pressure. This temperature can be maintained until the passivating solvent evaporates, leaving behind the metal nanoparticles deposited in the pores of the $Al_2O_3$. For example, if diethylene glycol mono-n-butyl ether as the passivating solvent, the homogenous dispersion can be heated to 231° C., the boiling point of the passivating solvent, under an $N_2$ flow. The temperature and $N_2$ flow are maintained until the passivating solvent is completely evaporated. After evaporating the passivating solvent, the powdered oxide and metal nanoparticles are left behind on the walls of the reaction vessel as a film or residue. When the powdered oxide is $Al_2O_3$, the film will typically be black. The metal nanoparticle and powdered oxide film can be removed from the reaction vessel and ground to create a fine powder, thereby increasing the available surface area of the mixture. The mixture can be ground with a mortar and pestle, by a commercially available mechanical grinder, or by any other methods of increasing the surface area of the mixture will be apparent to those of skill in the art.

Without being bound by any particular theory, it is believed that the powdered oxide serves two functions during the extraction process. The powdered oxides are porous and have high surface area. Therefore, the metal nanoparticles will settle in the pores of the powdered oxide during secondary dispersion. Settling in the pores of the powdered oxide physically separates the metal nanoparticles from each other, thereby preventing agglomeration of the metal nanoparticles during extraction. This effect is complemented by the amount of powdered oxide used. As noted above, the weight ratio of metal nanoparticles to powdered oxide can be between about 1:10 and 1:15, such as, for example, 1:11, 1:12, 2:25, 3:37, 1:13, 1:14, and the like. The relatively larger amount of powdered oxide in effect serves to further separate or 'dilute' the metal nanoparticles as the passivating solvent is removed. The process thus provides metal nanoparticles of defined particle size.

As will be apparent to those of skill in the art, the catalyst thus prepared can be stored for later use. In another aspect, the metal nanoparticles can be previously prepared, isolated from the passivating solvent, and purified, and then added to a powdered oxide in a suitable volume of the same or different passivating solvent. The metal nanoparticles and powdered oxide can be homogenously dispersed, extracted from the passivating solvent, and processed to increase the effective surface area as described above. Other methods for preparing the metal nanoparticle and powdered oxide mixture will be apparent to those skilled in the art.

The metal nanoparticles thus formed can be used as a growth catalyst for synthesis of carbon nanotubes, nanofibers, and other one-dimensional carbon nanostructures by a chemical vapor deposition (CVD) process.

V. Carbon Precursors

The carbon nanotubes can be synthesized using carbon precursors, such as carbon containing gases. In general, any carbon containing gas that does not pyrolize at temperatures up to 800° C. to 1000° C. can be used. Examples of suitable carbon-containing gases include carbon monoxide, aliphatic hydrocarbons, both saturated and unsaturated, such as methane, ethane, propane, butane, pentane, hexane, ethylene, acetylene and propylene; oxygenated hydrocarbons such as acetone, and methanol; aromatic hydrocarbons such as benzene, toluene, and naphthalene; and mixtures of the above, for example carbon monoxide and methane. In general, the use of acetylene promotes formation of multi-walled carbon nanotubes, while CO and methane are preferred feed gases for formation of single-walled carbon nanotubes. The carbon-containing gas may optionally be mixed with a diluent gas such as hydrogen, helium, argon, neon, krypton and xenon or a mixture thereof VI. Synthesis of Carbon Nanotubes The methods and processes of the invention provide for the synthesis of SWNTs with a narrow distribution of diameters. The narrow distribution of carbon nanotube diameters is obtained by activating small diameter catalyst particles preferentially during synthesis by selecting the lowest eutectic point as the reaction temperature.

In one aspect of the invention, the metal nanoparticles supported on powdered oxides can be contacted with the carbon source at the reaction temperatures according to the literature methods described in Harutyunyan et al., Nano-Letters 2, 525 (2002). Alternatively, the metal nanoparticles supported on the oxide powder can be aerosolized and introduced into the reactor maintained at the reaction temperature. Simultaneously, the carbon precursor gas is introduced into the reactor. The flow of reactants within the reactor can be controlled such that the deposition of the carbon products on the walls of the reactor is reduced. The carbon nanotubes thus produced can be collected and separated.

The metal nanoparticles supported on the oxide powder can be aerosolized by any of the art known methods. In one method, the supported metal nanoparticles are aerosolized using an inert gas, such as helium, neon, argon, krypton, xenon, or radon. Preferably argon is used. Typically, argon, or any other gas, is forced through a particle injector, and into the reactor. The particle injector can be any vessel that is capable of containing the supported metal nanoparticles and that has a means of agitating the supported metal nanoparticles. Thus, the catalyst deposited on a powdered porous oxide substrate can be placed in a beaker that has a mechanical stirrer attached to it. The supported metal nanoparticles can be stirred or mixed in order to assist the entrainment of the catalyst in the transporter gas, such as argon.

Thus, the nanotube synthesis generally occurs as described in the co-pending and co-owned application U.S. Ser. No. 10/727,707, filed on Dec. 3, 2003. An inert transporter gas, preferably argon gas, is generally passed through a particle injector. The particle injector can be a beaker or other vessel containing the growth catalyst supported on a powdered porous oxide substrate. The powdered porous oxide substrate in the particle injector can be stirred or mixed in order to assist the entrainment of the powdered porous oxide substrate in the argon gas flow. Optionally, the inert gas can be passed through a drying system to dry the gas. The argon gas, with the entrained powdered porous oxide, can then be passed through a pre-heater to raise the temperature of this gas flow to about 400° C. to about 500° C. The entrained powdered porous oxide is then delivered to the reaction chamber. A flow of methane or another carbon source gas and hydrogen is also delivered to the reaction chamber. The typical flow rates can be 500 sccm for argon, 400 sccm for methane, and 100 sccm for He. Additionally, 500 sccm of argon can be directed into the helical flow inlets to reduce deposition of carbon products on the wall of the reaction chamber. The reaction chamber can be heated to between about 300° C. and 900. ° C. during reaction using heaters. The temperature is preferably kept below the decomposition temperature of the carbon precursor gas. For example, at temperatures above 1000° C., methane is known to break down directly into soot rather than forming carbon nanostructures with the metal growth catalyst. Carbon nanotubes and other carbon nanostructures synthesized in reaction chamber can then be collected and characterized.

The specific reaction temperature used depends on the type of catalyst and the type of precursor. Energy balance equations for the respective chemical reactions can be used to analytically determine the optimum CVD reaction temperature to grow carbon nanotubes. This determines the required reaction temperature ranges. The optimum reaction temperature also depends on the flow rates of the selected precursor and the catalyst. In general, the method requires CVD reaction temperatures ranging from 300° C. to 900° C.

In another aspect, the reaction temperature is selected to be lower than the melting point of the catalyst particles and at about the eutectic point of the mixture of the metal particles and carbon. The reaction temperature can be selected to be at about the eutectic point, preferably about 5° C. to about 150° C. above the eutectic point, more preferably about 10° C. to about 100° C. above the eutectic point. Thus, the reaction temperature can be selected to be the eutectic point+5° C., eutectic point+15° C., eutectic point+50° C., eutectic point+70° C., eutectic point+80° C. and the like. In another aspect, the reaction temperature can be about 1% to about 25% above the eutectic point, preferably about 2% to about 15% above the eutectic point, or more preferably about 2% to about 10% above the eutectic point.

Figure 1:
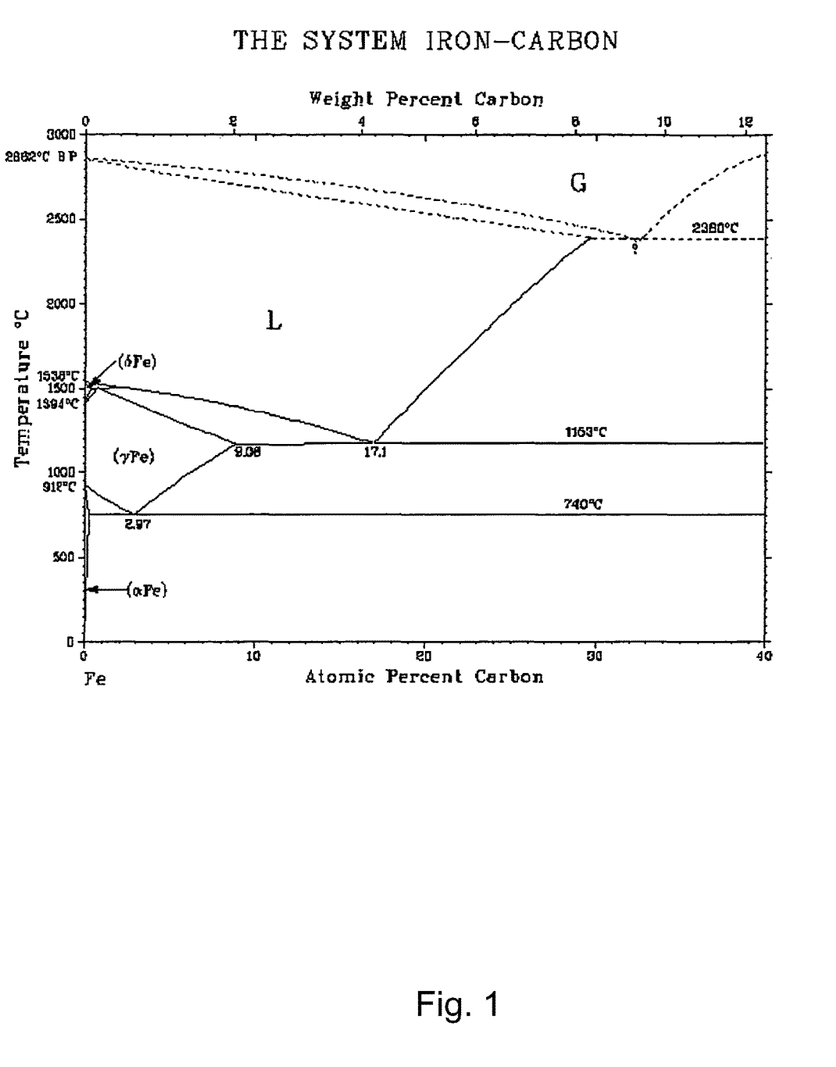
FIG. 1 provides a phase diagram for iron-carbon.

The eutectic point can be obtained from a binary phase diagram that shows the phases formed in differing mixtures of two or more elements over a range of temperatures. As is known in the art, the vertical axis of the phase diagram can be the temperature, and the horizontal axis can be compositions ranging from 100% of the catalyst through all possible mixtures to 100% of carbon. The composition can be given in a form of A-X % carbon, where A is the catalyst, and where weight percentages or molar percentages can be used to specify the portions of the metal catalyst and carbon. A typical iron-carbon phase diagram is shown in FIG. 1. As can be seen, the carbon concentration affects the liquid line of iron-carbon nanoparticles. The melting point of Fe is 1538° C. A 4.3 wt % carbon content decreases the melting temperature to 1140° C. (the eutectic point) at which the iron-carbon alloy can remain liquid. A higher carbon concentration leads to a sharp increase in the liquefaction temperature (e.g. the liquefaction temperature is about 2500° C. in case of—8 wt % carbon content).

According to the binary phase diagrams, the eutectic points of bulk cobalt-carbon and nickel-carbon correspond to—2.7 wt % (1321° C.) and—2 wt % (1326° C.) carbon concentration in the metal-carbon alloy, respectively. These are about two times lower and their eutectic temperatures higher than for the iron-carbon phase. The increase of carbon concentration above the eutectic point results in a sharper increase of the liquefaction lines of cobalt-carbon and nickel-carbon phases when compared to the iron-carbon phase. Therefore, cobalt and nickel catalysts will require higher synthesis temperature.

In another aspect, the eutectic point can be calculated using art known equations. For small particles, there are many different art approaches for theoretically determining the dependence of the melting temperatures with the particle size. According to the Gibbs-Thompson effect, the melting point of metal particles with a radius (r) can be approximated by the equation $$Tm(r) = T_m^{bulk}[1 - 2\gamma K(r)/\Delta H] \qquad \text{i.}$$

where $T_m^{bulk}$ and $\Delta H$ are the bulk melting temperature and the latent heat per volume unit, respectively [33]. $\gamma$—Is the interfacial tension between the particle and its environment and $K \sim 1/r$ is a characteristic related to the curvature of the nanoparticle. Theoretical estimations have demonstrated that the melting point of the transition metals experiences a decrease going from the bulk metal to particles with diameters below 100 nm. This drop is significant (~30%) for particles below 10 nm and, in the case of ~1-3 nm, they even become liquid at temperatures lower than ~700° C. Thus, the iron nanoparticles with a mean diameter less than 1 nm, are expected to be liquid at 800° C. (the synthesis temperature).

Without being bound by any particular theory, it is believed that the melting temperature of the catalyst nanoparticles is an important parameter in the synthesis of SWNTs. A commonly accepted mechanism for carbon filament growth provides for the diffusion of carbon through the metal particles. Therefore, the diffusion of carbon atoms through the catalyst nanoparticles, such as iron nanoparticles, results in the liquefaction of the catalyst particles during the SWNTs growth at temperatures below the melting point of initial catalyst. Thus, the hydrocarbon gas decomposes on the surface of the metal nanoparticles to release hydrogen and carbon, and carbon dissolves in the nanoparticles. The dissolved carbon diffuses through the catalyst nanoparticle lowering the melting point, thereby resulting in the liquefaction of the •nanoparticles. The SWNTs grow from this liquid metal catalyst. A further increase of absorbed carbon concentration above the eutectic point results in an increase of the liquefaction temperature, eventually causing the solidification of the nanoparticles. The diffusion of carbon through the solid iron-carbon phase is very slow, for example, for $Fe_3C$ the diffusion coefficient is $D=6\times10^{-12}$ $cm^2/s$ at 650° C. For comparison, the diffusion of carbon atoms through the Fe nanoparticles with r<3 nm in liquid state is $D \cdot 10^{-5}$ $cm^2/s$. Therefore, the formation of solid iron-carbon phases during tubes growth decreases the carbon atoms diffusion, which slows down and eventually stops the growth. Thus, it is believed that SWNTs grow when the catalyst is in a liquid state. The diffusion of carbon into the catalyst nanoparticles results in metal nanoparticle liquefaction at low temperatures, thereby permitting the synthesis of SWNTs at about the eutectic point.

In another aspect, a range of particle diameters within the distribution of the catalyst sizes can be selected for the synthesis of SWNTs by selecting the temperature at which the production of the SWNTs is carried out. The synthesis of the catalyst nanoparticles typically results in a Gaussian distribution of particle sizes. Thus, for example, the synthesis of 1 nm Fe catalysts can have a distribution of particle diameters ranging from about 0.01 nm to about 5 nm, with the majority of particle diameters centering around 1 nm. Normally, the catalysts would be further processed to obtain a tighter distribution of catalyst particle sizes. In contrast, the present methods and process allow for the selection of a narrow distribution of catalyst particles without further processing. In the inventive methods, the reaction temperature can be selected such that it is near or above the eutectic point and so that catalyst particle sizes smaller than the mean are first used for the synthesis of SWNTs. As these catalysts become exhausted, the reaction temperature can be raised such that catalyst particles of sizes near the mean are used for the synthesis of SWNTs. The reaction temperature can be further raised such that catalyst particles of sized near the upper range are used for the synthesis of SWNTs. The methods and processes of the present invention thus have the advantage that the particle size of the catalyst need not be tightly controlled during the synthesis of the catalyst, thereby providing for economical production of SWNTs.

In one aspect of the invention, the diameter distribution of the synthesized SWNTs is substantially uniform. Thus, about 90% of the SWNTs have a diameter within about 25% of the mean diameter, more preferably, within about 20% of the mean diameter, and even more preferably, within about 15% of the mean diameter. Thus, the diameter distribution of the synthesized SWNTs can be about 10% to about 25% within the mean diameter, more preferably about 10% to about 20% of the mean diameter, and even more preferably about 10% to about 15% of the mean diameter.

The carbon nanotubes and nanostructures produced by the methods and processes described above can be used in applications that include Field Emission Devices, Memory devices (high-density memory arrays, memory logic switching arrays), Nano-MEMs, AFM imaging probes, distributed diagnostics sensors, and strain sensors. Other key applications—include: thermal control materials, super strength and light weight reinforcement and nanocomposites, EMI shielding materials, catalytic support, gas storage materials, high surface area electrodes, and light weight conductor cable and wires, and the like.

EXAMPLES

Below are examples of specific embodiments for carrying out the present invention. The examples are offered for illustrative purposes only, and are not intended to limit the scope of the present invention in any way. Efforts have been made to ensure accuracy with respect to numbers used (e.g., amounts, temperatures, etc.), but some experimental error and deviation should, of course, be allowed for.

Example 1

Preparation of the Supported Catalyst

Catalysts were prepared by impregnating support materials in metal salt solutions. Three different groups of catalyst particles were synthesized and used for growing SWNTs by CVD. Two groups of narrow dispersed iron catalysts, with average diameters of about 5 nm and about 9 nm, were obtained by thermal decomposition of iron acetate in glycol solution under nitrogen atmosphere. The reaction time and iron acetate/glycol ratio were changed to control the sizes of nanoparticles. $FeAc_2$ in methanol was used at a molar ratio of $Fe:Al_2O_3$ of 1:15. Under a nitrogen atmosphere, $FeAc_2$ was added to dietheylene glycol mono-n-butyl ether in the molar ratio of 1 mM:20 mM. The reaction mixture was mixed under the nitrogen atmosphere using a magnetic stir bar, and heated under reflux for 90 minutes. The reaction mixture was then cooled to room temperature, and $Al_2O_3$ (15 mM) was added at once. The reaction solution was stirred at room temperature for 15 minutes, and then heated to 150° C. for 3 hours. The reaction was cooled to 90° C. while flowing a stream of $N_2$ over the mixture to remove the solvent. A black film formed on the walls of the reaction flask. The black film was collected and ground with an agate mortar to obtain a fine black powder.

The third group of catalyst was prepared by a common wet catalyst method, using iron (II) sulfate and alumina support powder (molar ratio $Fe:Al_2O_3=1:15$), with the in-situ formation of the iron nanoparticles inside the pores of the support as described in A. R. Harutyunyan, B. K. Pradhan, U. J. Kim, G. Chen, and P. C. Eklund, NanoLetters 2, 525 (2002).

Example 2

Synthesis of Carbon Nanotubes

Figure 2:
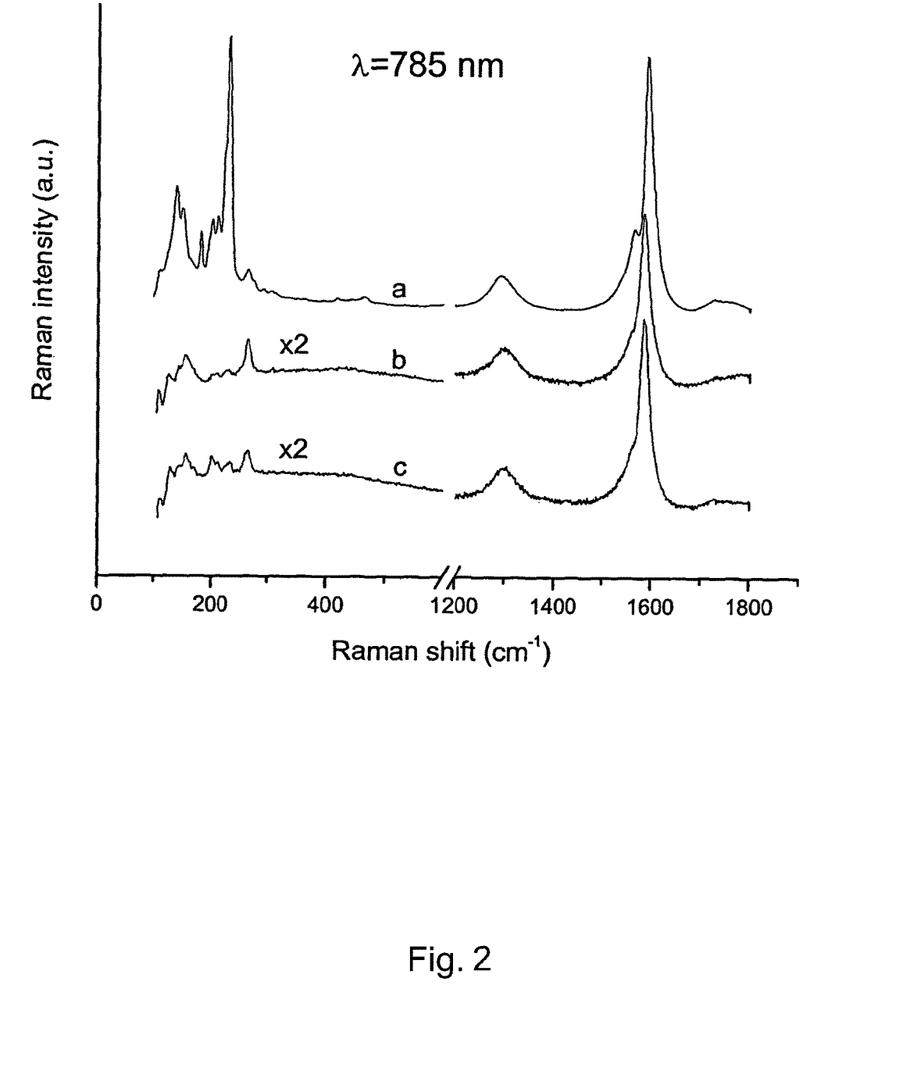
FIG. 2 depicts Raman spectra of carbon SWNTs (k=532 nm excitation) grown using Fe nanoparticles with mean diameters: a) less than 1 nm, b) about 5 nm and c) about 9 nm.
Figure 3A:
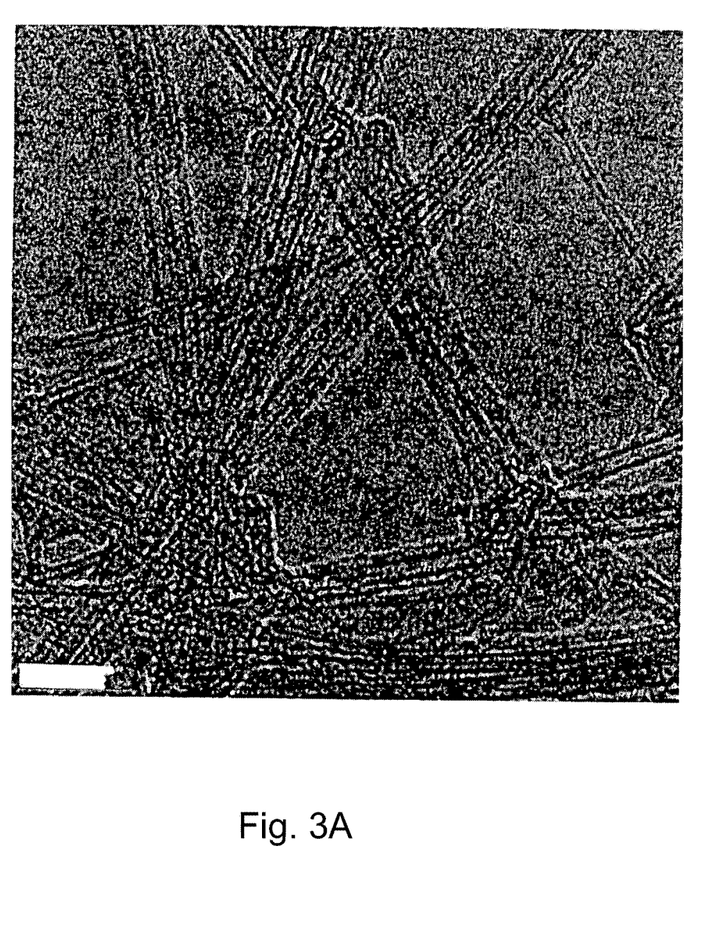
FIG. 3A depicts TEM images of the single-walled carbon nanotubes produced using Fe nanoparticles with mean diameters of less than 1 nm.
Figure 3B:
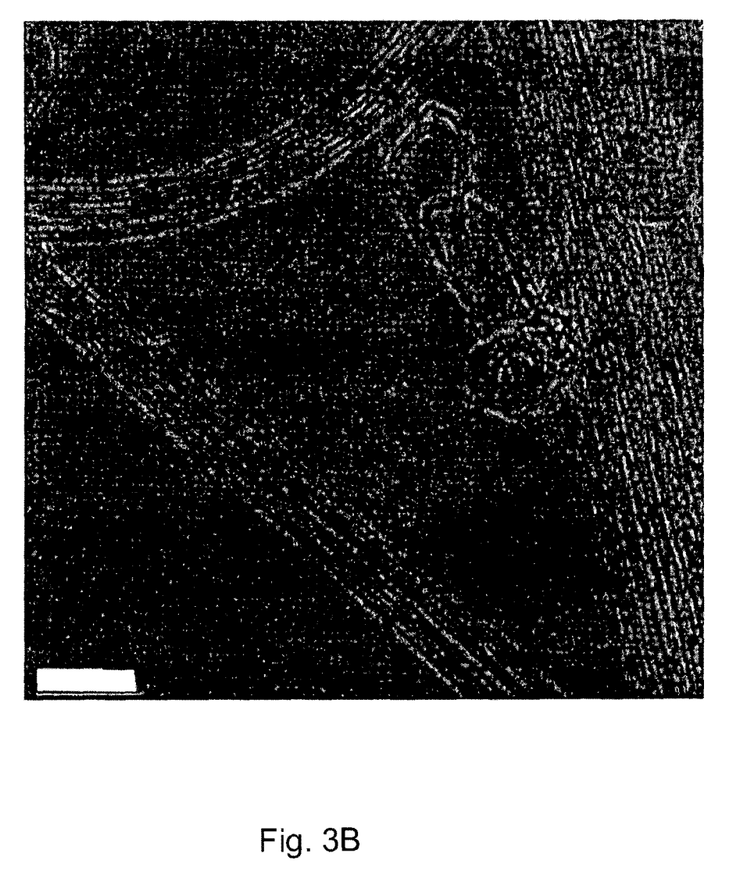
FIG. 3B depicts TEM images of the single-walled carbon nanotubes produced using Fe nanoparticles with mean diameters of about 5 nm.
Figure 3C:
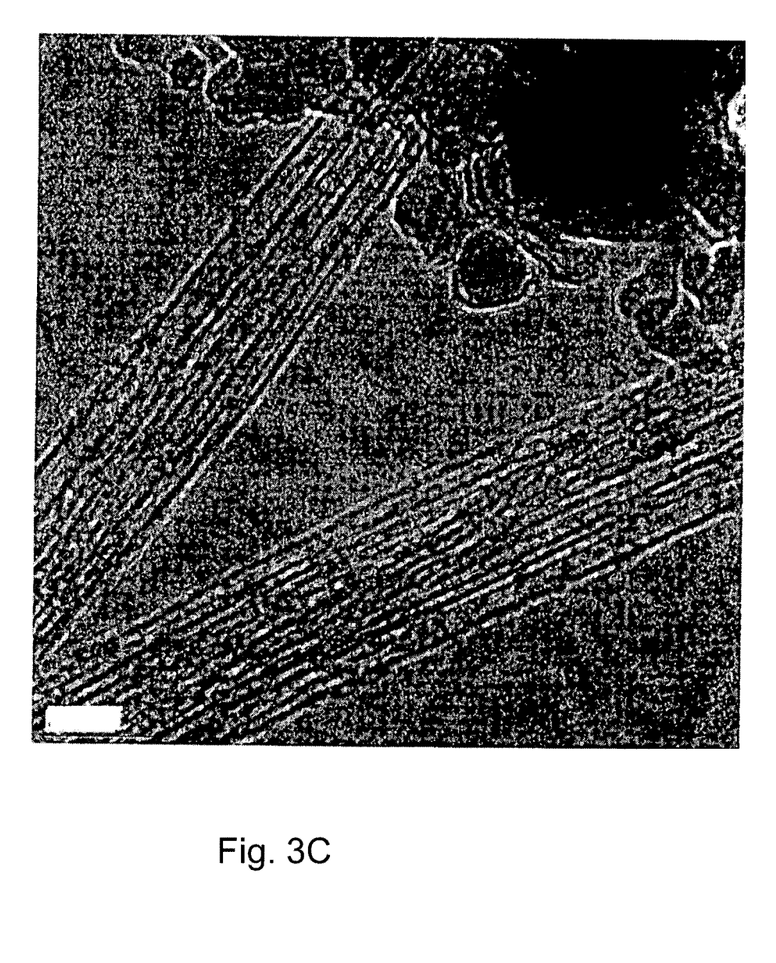
FIG. 3C depicts TEM images of the single-walled carbon nanotubes produced using Fe nanoparticles with mean diameters of about 9 nm.

Carbon nanotubes were synthesized by using the experimental setup described in Harutyunyan et al., NanoLetters 2, 525 (2002). CVD growth of SWNTs, with the three different catalysts, used methane as a carbon source (T=800° C., methane gas flow rate 60 sccm). In all cases, carbon SWNTs were successfully synthesized with the yields ~4, 7 and 15 wt % (wt % carbon relative to the iron/alumina catalyst) for the catalysts with the diameters 9, 5 nm and for catalyst made by of iron-sulfate decomposition, respectively. Analysis of many transmission electron microscopy (TEM) images of SWNTs produced by using 9 nm iron nanoparticles showed bundles with an average diameter of—10-15 nm, while in case of 5 nm iron catalyst was ~7-12 nm. The iron-sulfate decomposed catalyst showed bundles with diameter~5-10 nm as well as many individual SWNTs. In all cases, a distribution of SWNTs diameters from 0.8 to 2 nm were observed. A Raman spectra of carbon SWNTs is shown for λ=785 nm laser excitation is shown in FIG. 2. The TEM images of the single-walled carbon nanotubes thus produced is shown in FIG. 3.

While the invention has been particularly shown and described with reference to a preferred embodiment and various alternate embodiments, it will be understood by persons skilled in the relevant art that various changes in form and details can be made therein without departing from the spirit and scope of the invention. All printed patents and publications referred to in this application are hereby incorporated herein in their entirety by this reference.

The invention claimed is:

1. A chemical vapor deposition method for the preparation of single-wall carbon nanotubes (SWNT), the method comprising:
   providing a catalyst comprising particles having a range of particle sizes on a support, wherein the support comprises one or more support materials and wherein the catalyst comprises a metal;
   determining a particle size for a first portion of the catalyst on the support, wherein the particle size for the first portion is different than a particle size for a second portion of the catalyst on the support;
   determining the eutectic temperature wherein the metal-carbon phase of the first portion of the catalyst is liquefied by carbon-induced liquefaction based on the particle size of the first portion of the catalyst and an identity of the metal;
   selecting the reaction temperature that selectively activates the first portion of the catalyst without activating the second portion of the catalyst, wherein the reaction temperature is 5 degrees Celsius to 150 degrees Celsius above the eutectic temperature;
   contacting the catalyst with a carbon source gas at the reaction temperature; and
   producing single-walled carbon nanotubes having diameters within 25% of a mean SWNT diameter.

2. The method of claim 1, wherein the carbon source gas is methane.

3. The method of claim 1, wherein providing the catalyst comprises aerosolizing the particles using an inert gas selected from the group consisting of argon, helium, nitrogen, and combinations thereof.

4. The method of claim 1, wherein the catalyst is iron, molybdenum, or combinations thereof.

5. The method of claim 1, wherein the one or more support materials comprises a powdered oxide.

6. The method of claim 5, wherein the powdered oxide is selected from the group consisting of $Al_2O_3$, $SiO_2$, MgO and zeolites.

7. The method of claim 6, wherein the powdered oxide is $Al_2O_3$.

8. The method of claim 1, wherein the catalyst and the support are in a ratio of about 1:1 to about 1:50.

9. The method of claim 8, wherein the ratio is 1:5 to 1:25.

10. The method of claim 9, wherein the ratio is 1:10 to 1:20.

11. The method of claim 1, wherein the reaction temperature is 10° C. to 100° C. above the lowest temperature wherein the metal-carbon phase of the first portion of the catalyst is liquefied by carbon-induced liquefaction.

12. The method of claim 1, wherein the reaction temperature is 50° C. above the lowest temperature wherein the metal-carbon phase of the first portion of the catalyst is liquefied by carbon-induced liquefaction.

13. The method of claim 12, wherein the reaction temperature is 80° C. above the lowest temperature wherein the metal-carbon phase of the first portion of the catalyst is liquefied by carbon-induced liquefaction.

14. The method of claim 1 wherein the particle size of the first portion is between 1 nm and 10 nm.

15. The method of claim 14, wherein the particle size of the first portion is about 1 nm.

16. The method of claim 14, wherein the particle size of the first portion is about 3 nm.

17. The method of claim 14, wherein the particle size of the first portion is about 5 nm.

18. The method according to claim 1, wherein the range of particle sizes is such that the catalyst has a diameter distribution of about 10 nm.

19. The method according to claim 1, further comprising raising the reaction temperature to activate the second portion of the catalyst,
   wherein the particle size of the second portion of the catalyst is larger than the particle size of the first portion of the catalyst.

20. The method according to claim 19, further comprising determining a particle size for a third portion of the catalyst on the support; and raising the reaction temperature to activate the third portion of the catalyst,
   wherein the particle size of the third portion of the catalyst is larger than the particle size of the first portion of the catalyst and the second portion of the catalyst.

21. A chemical vapor deposition method for the preparation of single-wall carbon nanotubes (SWNT), the method comprising:
   providing a metal catalyst comprising particles having a distribution of particle sizes on a support, wherein the distribution of particle sizes includes a first range of particle diameters and a second range of particle diameters, wherein the second range consists of particle diameters greater than the particle diameters of the first range;
   selecting a reaction temperature at or above the eutectic point of the metal catalyst particles in the first range and carbon, but lower than the eutectic point of the metal catalyst particles in the second range and carbon; and
   contacting the metal catalyst particles with a carbon source at the reaction temperature to selectively form single-walled carbon nanotubes with the metal catalyst particles in the first range.

22. The method of claim 21, further comprising:
   raising the reaction temperature to at or above the eutectic point of the metal catalyst particles in the second range and carbon as the metal catalyst particles in the first range become exhausted; and
   contacting the metal catalyst particles with a carbon source at the raised reaction temperature to selectively form single-walled carbon nanotubes with the metal catalyst particles in the second range.

* * * * *